(12) United States Patent
Lacome et al.

(10) Patent No.: US 9,962,795 B2
(45) Date of Patent: May 8, 2018

(54) INTERNAL LINE-UP CLAMPS FOR WELDING PIPES

(71) Applicant: Acergy France SAS, Suresnes (FR)

(72) Inventors: Jacques Lacome, Sucy en Brie (FR); Cesar Atin, Nanterre (FR)

(73) Assignee: Acergy France SAS, Suresnes (FR)

( * ) Notice: Subject to any disclaimer, the term of this patent is extended or adjusted under 35 U.S.C. 154(b) by 73 days.

(21) Appl. No.: 14/894,990

(22) PCT Filed: May 23, 2014

(86) PCT No.: PCT/IB2014/001074
§ 371 (c)(1),
(2) Date: Nov. 30, 2015

(87) PCT Pub. No.: WO2014/191829
PCT Pub. Date: Dec. 4, 2014

(65) Prior Publication Data
US 2016/0114436 A1    Apr. 28, 2016

(30) Foreign Application Priority Data
May 30, 2013   (GB) .................................. 1309687.0

(51) Int. Cl.
*B23K 37/00*   (2006.01)
*F16L 13/02*   (2006.01)
*B23K 37/053*  (2006.01)

(52) U.S. Cl.
CPC .......... *B23K 37/0531* (2013.01); *F16L 13/02* (2013.01)

(58) Field of Classification Search
None
See application file for complete search history.

(56) References Cited

U.S. PATENT DOCUMENTS 1,962,351 A * 6/1934 Kane .................. B23K 37/0531
                                                                    228/50
1,964,926 A     7/1934 Moss
2,430,266 A * 11/1947 Zimmerman .......... B23K 9/035
                                                                    219/137 R
(Continued)

FOREIGN PATENT DOCUMENTS

BE        531504       9/1954
GB       2 067 945     8/1981
(Continued)

*Primary Examiner* — Devang R Patel
(74) *Attorney, Agent, or Firm* — Levy & Grandinetti (57) ABSTRACT

An internal line-up clamp for welding pipe lengths end-to-end includes a clamp ring made up of a plurality of clamp ring elements that are angularly distributed around the circumference of the clamp ring. The clamp ring elements are divided into mutually opposed groups that are interdigitated such that the clamp ring elements alternate from one group to the other around the circumference of the clamp ring. A longitudinally-acting actuator system drives relative longitudinal movement of the groups to effect clamping expansion of the clamp ring by wedging interaction between the circumferentially-alternating clamp ring elements of the groups. By expanding the clamp ring in alignment with a weld plane between the abutting ends, the same clamp ring may be used to align the pipe lengths and to back a weld between them.

24 Claims, 5 Drawing Sheets

(56) References Cited

U.S. PATENT DOCUMENTS

| | | | |
|---|---|---|---|
| 2,777,048 A | | 1/1957 | Kocks |
| 2,823,634 A | | 2/1958 | Barth |
| 3,229,884 A | * | 1/1966 | Franklin ............... B23K 9/035 |
| | | | 219/160 |
| 3,445,104 A | | 5/1969 | Douglas |
| 3,461,264 A | | 8/1969 | Nelson et al. |
| 3,498,518 A | | 3/1970 | Wheeler et al. |
| 4,177,914 A | * | 12/1979 | Clavin ............... B23K 37/0531 |
| | | | 228/49.3 |
| 4,556,162 A | | 12/1985 | Gwin et al. |
| 4,890,473 A | * | 1/1990 | Westerman ........ B23K 37/0533 |
| | | | 228/49.3 |
| 4,919,223 A | | 4/1990 | Egger et al. |
| 5,110,031 A | * | 5/1992 | Rinaldi .............. B23K 37/0531 |
| | | | 219/160 |
| 5,285,947 A | * | 2/1994 | Depperman ....... B23K 37/0531 |
| | | | 228/49.3 |
| 5,288,005 A | | 2/1994 | Beakley et al. |
| 6,119,916 A | * | 9/2000 | Anderson .......... B23K 37/0531 |
| | | | 219/61.1 |
| 7,410,087 B1 | * | 8/2008 | Owensby ........... B23K 37/0435 |
| | | | 228/44.5 |

FOREIGN PATENT DOCUMENTS

| | | |
|---|---|---|
| GB | 2 355 425 | 4/2001 |
| KR | 10-0999942 | 12/2010 |
| WO | WO 95/21721 | 8/1995 |

\* cited by examiner

INTERNAL LINE-UP CLAMPS FOR WELDING PIPES

This invention relates to fabrication by welding of pipelines, for example pipelines for subsea applications in the oil and gas industry. The invention relates specifically to internal line-up clamps (ILUCs) suitable for use in welding together lengths of small-diameter pipe in end-to-end alignment.

In the context of the oil and gas industry, a small-diameter pipe is typically less than 6 inches (about 150 mm) in external diameter, and more typically around 4.5 inches (about 113 mm) in external diameter. However, the broadest inventive concept is not limited to a particular size of ILUC or to its use with a particular size of pipe.

The ILUC of the invention is particularly suited to automatic welding processes involving gas metal arc welding (GMAW) although the inventive concept does not exclude other processes and welding techniques.

Pipelines are fabricated from lengths of pipe such as pipe joints of standard length (typically 12 m or multiples of 12 m) or pipe stalks comprising multiple pipe joints already welded end-to-end. Pipe used for subsea pipelines is typically of steel although liners of other metals or other materials are possible. The pipe will usually also have an outer coating for corrosion resistance and optionally also for insulation. For example, fusion-bonded epoxy (FBE) may be used for corrosion resistance whereas polypropylene or polyurethane may be used for insulation.

Girth welds between pipe lengths are typically formed by multiple passes around the pipe circumference in an arc welding process. Welding is followed by testing to check the weld for defects and then by field joint coating to protect and optionally also to insulate the weld and the surrounding area of the pipe.

Welding, testing and coating may, for example, be required to create pipe stalks at a coastal spoolbase. Welding, testing and coating may also be required between pipe stalks to fabricate a pipeline at a spoolbase before spooling the pipeline onto a reel for storage and transportation to an offshore installation site. Alternatively, welding, testing and coating may be performed offshore on a pipelay vessel that fabricates a pipeline during S-lay or J-lay operations.

To shorten the pipeline fabrication process and so to reduce tie-up of expensive assets such as pipelay vessels, it is important to minimise time spent on critical-path operations such as welding and also to minimise the need for remedial work caused by defective welds. In this respect, it is essential that weld quality and pipeline integrity are maintained. With a view to those objectives, the pipe lengths must be aligned quickly and accurately to maximise weld quality and to ensure that the internal profile of the pipeline is as smooth as possible.

Before welding, the ends of opposed pipe lengths are bevelled or re-bevelled if necessary and thoroughly cleaned and dressed. The pipe lengths are then pulled together end-to-end and aligned, while setting a precise weld root gap to ensure full root penetration.

To locate the abutting ends of the pipe lengths and to maintain alignment between them during the welding operation, an ILUC is positioned internally to bridge the abutting ends of the pipe lengths. The ILUC typically has a copper or ceramic backing element such as a plate or ring that is aligned with the weld plane to ensure that the root pass weld does not penetrate excessively into the pipe bore. Backing requires a backing ring to extend around the entire pipe circumference or for a smaller backing element to be turned relative to the clamp to follow circumferential movement of a welding head around the pipe during a weld pass.

The invention is therefore concerned with an ILUC for aligning two adjoining pipe lengths from inside and optionally also providing a backing plate or ring for automatic welding. It is a particular aim of the invention to provide an ILUC that may be made compact enough for use in small-diameter pipes and that minimises the time needed to clamp the pipe lengths before welding can take place.

Conventionally, an ILUC is positioned by the following steps:
(a) insert and longitudinally position the ILUC in a first pipe length;
(b) clamp the ILUC into that first pipe length, leaving an end of the ILUC protruding;
(c) bring the second pipe length into end-to-end alignment with the first pipe length around the protruding end of the ILUC;
(d) clamp the ILUC in the second pipe length to position the bevelled ends for welding; and
(e) optionally, clamp a backing plate or ring of the ILUC against the inside of the weld root gap.

Depending on pipe diameter and weight, step (c) can come first if one straight clamping system can act on the two pipe ends with only one clamp. This involves passing the ILUC along the adjoining pipe lengths to intersect the weld plane.

Conventionally, an ILUC comprises a shaft that, in use, extends along the common central longitudinal axis of the adjoining pipe lengths. The shaft carries locating structures such as plates extending radially from the shaft to locate the ILUC centrally within the pipe lengths. The locating structures may support wheels to ease longitudinal movement of the ILUC relative to the pipe lengths.

An ILUC typically also comprises two axially-spaced clamp systems, one for each pipe length, and a plate or ring for backing the weld to provide a heat sink against which the molten weld puddle will solidify. The clamp systems and the backing plate or ring have respective drive systems operable at different stages of the positioning process.

Clamp elements may be urged radially outwardly against the internal pipe walls by various means, such as longitudinal actuators with lever arms; wedge arrangements; radial actuators involving jacks, cylinders or motors; and inflatable systems employing airbags or bladders. For example, an ILUC may have pneumatically- or hydraulically-operated clamp elements such as shoes or pads distributed angularly about the central longitudinal axis of the shaft.

The interface between the ILUC and the pipe lengths is via pipe-contacting features such as wheels, locating plates, shoes, pads or other clamp elements. Longitudinal stopping is eventually achieved by clamping although an additional brake system may be provided to locate the ILUC before clamping. For example, a brake system may act on the wheels or employ jacks supported by the shaft.

U.S. Pat. No. 1,964,926 shows the basic principle of an ILUC. Two roller systems line up the ends of the pipes while leaving a groove between the pipe ends for welding. A backing shoe between the roller systems bears internally against the groove. In this case, however, the functions of clamping and backing are performed by separate equipment.

U.S. Pat. No. 2,777,048 discloses an ILUC with cooperating opposed wedges at radially inner and radially outer positions. Relative longitudinal axial movement between the opposed wedges varies the diameter of the ILUC for clamping and release.

U.S. Pat. No. 4,556,162 discloses a back-up ring for internal pipe-welding apparatus, in which circumferentially-overlapping backing pads pivot about radial axes. In this way, the pads adapt to different pipe diameters to maintain a continuous back-up ring beneath the weld groove. However, clamping relies on radially-acting jacks that define the radial axes about which the pads can pivot.

GB 2067945 also discloses a weld back-up ring comprising circumferentially-overlapping backing pads. In this case a plurality of trapezoidal pads are disposed in a ring with their inclined faces facing one another and with their minor and major faces alternately facing in opposite directions. The pads are all urged radially outwardly by radial thrust springs; also, alternate pads are urged axially in opposite axial directions by longitudinal thrust springs so that the inclined faces always bear against one another. However, the pads are not capable of clamping; instead, the pads automatically but passively adapt to different pipe diameters to define a continuous back-up ring beneath the weld groove.

Similarly, KR 100999942 and WO 95/21721 disclose ILUCs having back-up rings comprising a group of axially-movable wedge pads in which opposed pads alternate circumferentially. In both cases, however, the ILUC is designed for large-diameter pipes and employs a separate clamping system to hold adjoining pipe lengths. The wedge pads do not clamp.

In contrast, GB 2355425 discloses an internal pipe clamp in which clamping and backing functions are both performed by a system of opposed circumferentially-alternating wedge pads. However, clamping still relies on radially-acting jacks and there is no line-up function: consequently, an outer clamp would have to be used in addition to the internal clamp to ensure alignment between the adjoining pipe lengths.

In GB 2355425, static wedge pads alternate with axially-movable wedge pads that are urged axially by spring bias in passive response to radial movement of the jacks. This arrangement risks the wedge pads becoming jammed in a radially-extended position or being damaged. There is also a need to swap modular components to configure the internal clamp for different pipe diameters.

BE 531504 discloses an internal pipe clamp in which clamping and backing functions are provided separately. For clamping purposes, BE 531504 discloses two cruciform supports that each carry a pair of pivoting longitudinal clamping arms and a pair of biasing wedges. The supports are arranged such that the clamping arms of one support oppose the biasing wedges of the other support. The supports are mounted on a central screw spindle along which they may be drawn toward one another, so that each clamping arm is urged radially outwardly by the opposing biasing wedge to clamp against the internal surfaces of abutting pipe elements.

Additionally, for backing purposes, BE 531504 discloses a backing ring formed from four dovetailed elements that lie beneath the weld interface. Each backing ring element is floatingly supported by a respective clamping arm. The backing ring elements slide relative to each other to follow radially-outward movement of the clamping arms as the supports move axially toward each other. However, the backing ring elements remain spaced from the internal surfaces of the pipe elements so as not to interfere with the clamping action of the clamping arms. Also, the disposition of the clamping arms and the screw spindle within the circumference of the backing ring militates against use of the clamp in small-diameter pipes.

A drawback shared by all of the internal pipe clamp mechanisms described above is their substantial bulk, which renders them unsuitable for use in a congested space inside small-diameter pipes. Their complexity is also disadvantageous in terms of cost, reliability, adaptability and ease of use.

In principle, it is possible to use a compact airbag solution to effect internal line-up of small-diameter pipes for welding. However, an airbag is typically of plastics material and has to be covered by ceramic plates to protect it from heat during welding.

Consequently, before the present invention, the conventional solution when welding small-diameter pipes has been to perform line-up and clamping only externally, which is less effective than using an ILUC.

Another problem in ILUC design relates to the brake system that holds the ILUC at a desired longitudinal position in the pipe before welding. Most prior art brake systems for ILUCs or backing devices effect braking by friction between the pipe and radially-pressing shoes or line-up clamp elements.

A drawback of braking separately from clamping is that angular deviations in the system may result in damage to jacks, shoes or pads used in brake systems or indeed in damage to the pipe itself. This problem may be addressed by using only one braking shoe or pad. For example, U.S. Pat. No. 3,445,104 discloses an ILUC having a single brake shoe on a lever arm that is supported by a frame and a line-up mechanism. However, this may not be enough to hold the clamping assembly in position.

U.S. Pat. No. 2,823,634 discloses an ILUC whose brake system comprises multiple hinged arms with respective friction pads that are applied against the inner wall of a pipe. The arms are hinged to a frame of the device, with springs acting between the frame and the arms maintaining contact between the pads and the pipe wall. This hinged system allows for angular deviations to some extent but it cannot apply a reliably strong braking force against the inside of the pipe.

An arrangement of opposed radially-acting jacks could be relied upon for axial location of an ILUC. An example of a jack arrangement is shown in U.S. Pat. No. 4,919,223, which does not disclose an ILUC but instead discloses a trolley that walks inside the pipeline. However, if used for braking an ILUC, such a jack arrangement would be particularly unforgiving of angular deviations in the system.

Against this background, in apparatus terms, the invention resides in an internal line-up clamp for welding pipe lengths end-to-end. The clamp comprises a clamp ring made up of a plurality of clamp ring elements that are angularly distributed around the circumference of the clamp ring and are divided into mutually opposed groups, which groups are interdigitated such that the clamp ring elements alternate from one group to the other around the circumference of the clamp ring. The clamp further comprises a longitudinally-acting actuator system arranged to drive relative longitudinal movement of the groups to effect clamping expansion of the clamp ring by wedging interaction between the circumferentially-alternating clamp ring elements of the groups.

The actuator system suitably comprises a pair of opposed actuators each acting on a respective one of the groups of clamp ring elements. At least one actuator of the actuator system is suitably double-acting to expand the clamp ring for clamping and to contract the clamp ring for insertion, longitudinal positioning and removal.

It is preferred that both groups of clamp ring elements are movable longitudinally relative to a support structure of the clamp. In that case, the actuator system is preferably arranged to synchronise longitudinal movement of the groups through a weld plane that is orthogonal to the direction of longitudinal movement.

The inventive concept also finds expression in a method of aligning pipe lengths disposed end-to-end for welding, which method comprises positioning an internal line-up clamp to bridge abutting ends of the pipe lengths and expanding a clamp ring of the clamp to effect clamping of the pipe lengths. In accordance with the invention, the clamp ring is expanded to apply clamping force to the pipe lengths by driving relative longitudinal movement between interdigitated groups of clamp ring elements to cause wedging interaction by relative movement along linked abutting edges of neighbouring clamp ring elements of the clamp ring.

The clamp ring is suitably expanded in alignment with a weld plane between the abutting ends, allowing the same clamp ring to align the pipe lengths and to back a weld between the pipe lengths.

Expansion of the clamp ring suitably involves pressing together the clamp ring elements. Conversely, contracting the clamp ring for insertion or withdrawal of the clamp suitably involves effecting relative longitudinal retracting movement between the interdigitated groups of clamp ring elements. At least one of the groups may be driven to effect the retracting movement. The clamp ring elements are preferably held together during contraction of the clamp ring.

By virtue of the invention, clamp ring elements are driven longitudinally so that expansion of the clamp ring applies sufficient force over a sufficient area around the weld plane to clamp the pipe lengths and also to provide weld backing. An additional clamp system is not necessary and so may be omitted.

The invention is distinguished from prior art segmented backing rings whose segments move essentially passively in response to the action of additional clamp systems. Such additional clamp systems add disadvantageous bulk and complexity, which the invention completely avoids. Also, the invention effects clamping and backing in a single operation involving expansion of the clamp ring and so saves valuable time.

Thus, the invention provides an ILUC arrangement that is suitable for small-diameter pipes and that may also have benefits if scaled up for larger-diameter pipes.

For compactness, at least one actuator of the actuator system is preferably positioned longitudinally outboard of the clamp ring. The actuator is advantageously connected to a clamp ring element by a linkage that applies a radially outward force component to the clamp ring element when forced longitudinally by the actuator. In that case, a guide may be provided on the actuator to guide movement of the linkage.

The actuator system preferably extends around a central longitudinal axis of the clamp. For example, the actuator system may comprise an annular structure that surrounds a central shaft of the clamp.

To effect wedging interaction, the clamp ring elements interact with their neighbours in the clamp ring via abutting edges of the clamp ring elements. The abutting edges of the clamp ring elements may be chamfered such that those elements taper radially inwardly in cross-section through the clamp ring.

Advantageously, neighbouring clamp ring elements are linked for relative movement along their abutting edges and are preferably held together against separation, most suitably by being held together at the abutting edges. For example, complementary connector formations may be provided on the abutting edges, with at least one such formation suitably extending along an abutting edge.

Each clamp ring element may comprise a radially-inner support surmounted by a radially-outer pad, which pad is outwardly arcuate in cross-section. At least an outer face of each clamp ring element suitably comprises a copper alloy, a ceramic or other weld-backing material.

To shield the weld from atmospheric gas, an outer face of at least one clamp ring element suitably has at least one groove or other opening that is positioned to lie under or adjacent to a weld location during welding. A gas-injection system communicates with that groove or opening to inject a shielding gas such as argon around the weld location.

To deal with the problem of angular deviations in the system when braking, the inventive concept extends to an internal line-up clamp comprising a support structure, the support structure supporting both a clamp system and a brake system, wherein the brake system comprises at least one brake unit that is mounted to the support structure by a pivot permitting limited angular movement between the brake unit and the support structure.

The brake unit comprises a movable brake element and an actuator for moving the brake element. For example, the brake unit may comprise two or more jacks acting radially outwardly in mutual opposition.

The pivot suitably comprises a bush, a swivel or a hinge between the support structure and the brake unit.

The structure is preferably elongate, with the clamp system being mounted at a central region of the support structure and the brake unit being mounted at, or adjacent to, an end of the support structure remote from the clamp system.

In order that the invention may be more readily understood, reference will now be made by way of example to the accompanying drawings, in which.

The drawings show various aspects of an ILUC 10 of the invention that is suitable for end-to-end welding of pipe lengths 12 of say 4.5" external diameter. The ILUC 10 serves as both a line-up clamp and a backing ring. Thus, the ILUC 10 is designed to align the longitudinal axes of the pipe lengths 12 accurately before welding and to present a backing ring to an inner side of the joint on a weld plane 14 to facilitate GMAW processes.

Figure 1:
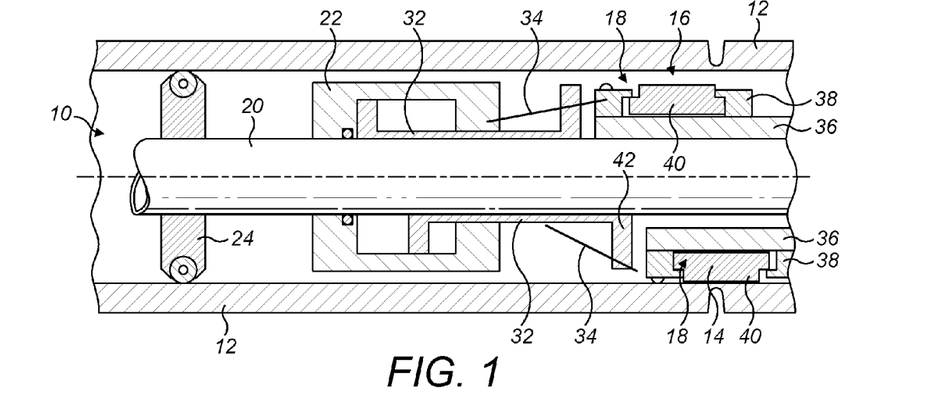
FIGS. 1 to 3 are axially-successive partial side views of an ILUC in accordance with the invention, shown here in longitudinal section, with FIGS. 1 and 2 showing clamp ring elements of the ILUC in both contracted and expanded positions and FIG. 3 showing an optional brake system of the ILUC having jacks shown in retracted and extended positions.
Figure 2:
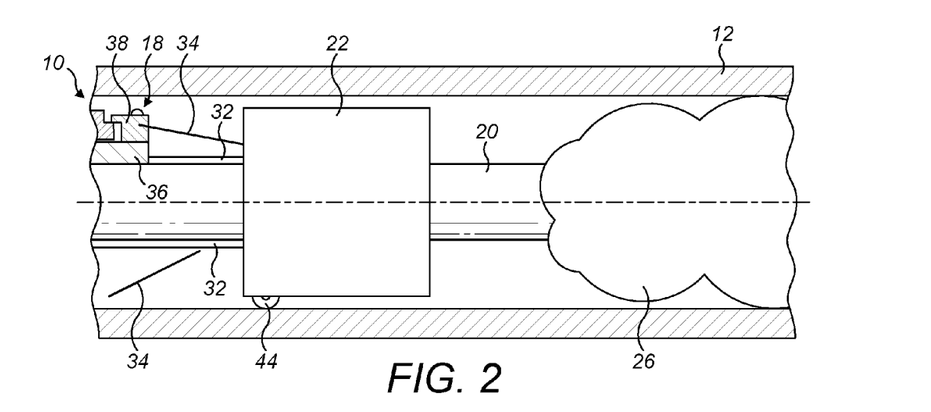
Figure 3:
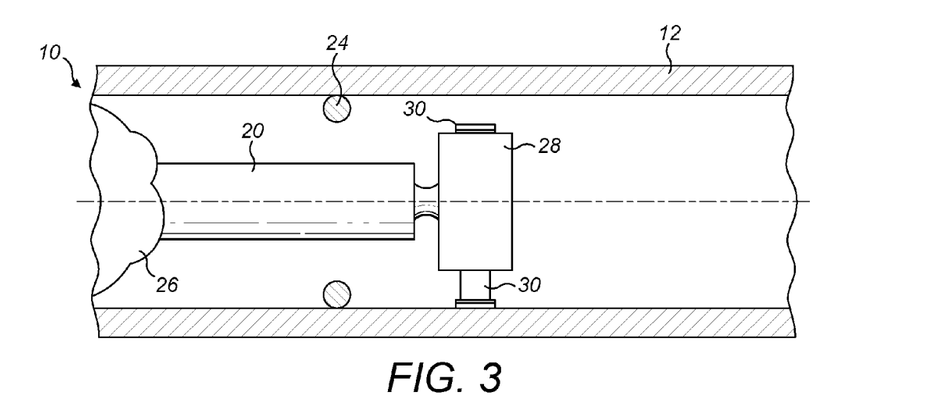

Referring specifically to FIGS. 1 to 3 of the drawings, line-up and backing functions are both performed by an expandable segmented clamp ring 16 that bridges the weld plane 14. The clamp ring 16 comprises opposed interdigitated wedge-shaped clamp ring elements 18 in dovetail relation whose structure, movement and interaction will be described in detail later with reference to FIGS. 4 to 8 of the drawings.

A frame or supporting structure of the ILUC 10 comprises an elongate shaft 20, which is suitably tubular as shown. In use between axially-aligned adjoining pipe lengths 12, the shaft 20 extends along the common central longitudinal axis of the pipe lengths 12 to cross the weld plane 14. The clamp ring 16 is positioned to bridge the weld plane 14 and is preferably centred on the weld plane 14.

In outward succession from the weld plane 14, the shaft supports:
 a pair of opposed actuators 22, which in this preferred example are pneumatic but could be hydraulic or electric, one each side of the clamp ring 16 in mirror image about the weld plane 14;
 a pair of rolling supports 24, each extending radially from the shaft 20 near a respective end of the shaft 20, which keep the shaft 20 approximately central within the pipe lengths 12 during insertion, longitudinal positioning and withdrawal and allow for translation of the ILUC 10 from one pipe length 12 to the next;
 an electro-valve system 26 for controlling clamping and braking; and
 a brake system comprising brake units 28 at one or both ends of the shaft 20, each brake unit 28 in this example comprising two or more jacks 30 acting radially in mutual opposition to lock the ILUC 10 against movement once appropriately positioned for clamping and welding the pipe lengths 12.

Practical implementations of the ILUC 10 will also include an external compressed air supply with pipes to supply the electro-valve system 26 and an external remote control. Those features are omitted from the drawings for clarity.

One end of each actuator 22, in this example an air cylinder, is rigidly attached to the shaft 20. The other end of each actuator 22 comprises a longitudinally-movable actuator rod 32, in this example a piston rod. The actuators 22 including their rods 32 are annular and surround the shaft 20.

The actuators 22 are double-acting so as to drive their respective actuator rods 32 parallel to or along the shaft 20 in two directions. Those directions are toward the weld plane 14 to expand the clamp ring 16 for clamping and away from the weld plane 14 to contract the clamp ring 16 for insertion and removal.

The actuators 22 are synchronised so that their actuator rods 32 always move in opposition to the same extent, in mirror-image about the weld plane 14. For ease of understanding, FIGS. 1 and 2 show the rods 32 in a retracted position in an upper view and in an extended position in a lower view.

Plural linkage rods 34, one for each clamp ring element 18, are angularly spaced in an umbrella-like arrangement around the central longitudinal axis of the shaft 20. Each linkage rod 34 can pivot in a respective radially-extending plane containing the central longitudinal axis of the shaft 20. For this purpose, each linkage rod 34 is connected by hinge connections at an outer end to the actuator rod 32 and at an inner end to a respective one of the clamp ring elements 18. These hinge connections are suitably made via hardened pins.

FIGS. 1 to 3 show some details that are omitted from, or simplified in, the other drawings for clarity and so will be described now. It can be seen that each clamp ring element 18 comprises a radially-inner support 36 surmounted by a radially-outer pad 38. As will be clear from FIGS. 4 to 7, the pad 38 has an arcuate outer cross-section that is contoured to match inner surfaces of the pipe lengths 12. The pad 38 is shown in FIGS. 1 and 2 with an optional floating insert 40. The pad 38—or, where used, the insert 40—is of a copper alloy, ceramic or other material as may be required for backing a weld to be made between the pipe lengths 12 on the weld plane 14.

FIG. 1 also shows one of multiple optional lateral supports to guide the linkage rods 34 and resist rotation or bending of the linkage rods 34 under load. In this example, such a lateral support is defined by a radial extension 42 of an actuator rod 32 positioned beside a linkage rod 34.

FIG. 2 also shows that a rolling support may be positioned elsewhere on the ILUC 10. In this example, a wheel 44 is disposed between an actuator 22 and the inner surface of a pipe length 12.

FIG. 3 shows the jacks 30 of the brake unit 28 in a retracted position in an upper view and in an extended position in a lower view.

Figure 4:
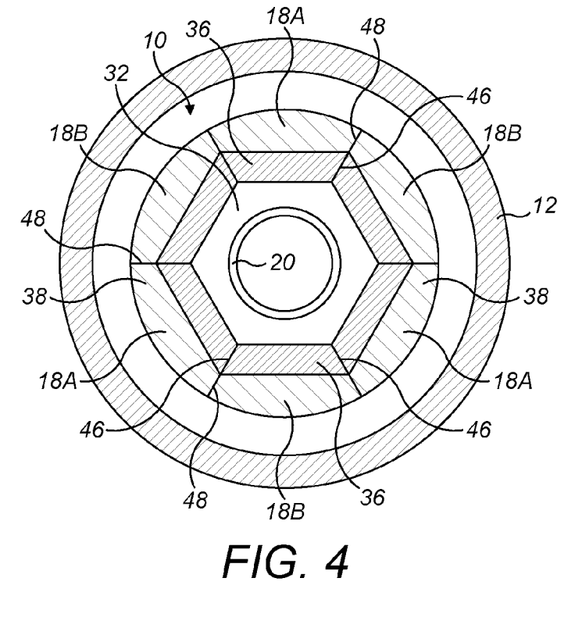
FIGS. 4 and 5 are schematic cross-sectional views in the weld plane shown in FIG. 1, showing a clamp ring of the ILUC respectively in contracted and expanded states.
Figure 5:
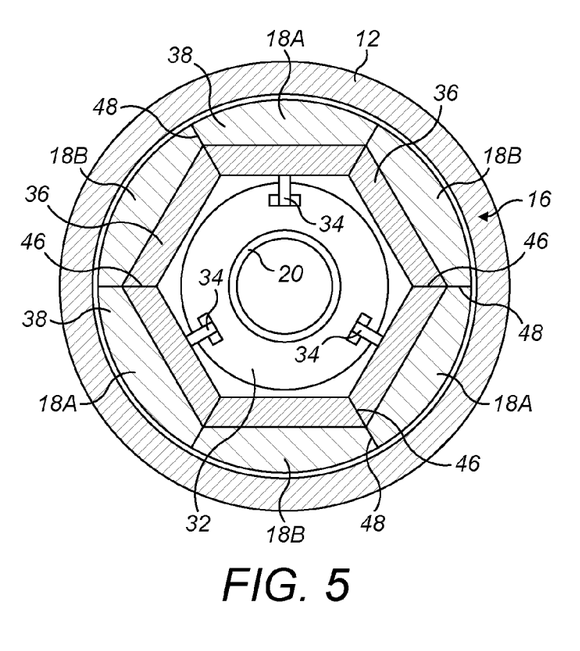

Moving on now to the schematic views of FIGS. 4 to 8, both views in FIGS. 4 and 5 are cross-sections taken in the weld plane 14 between the adjoining pipe lengths 12 and through the ILUC 10. They show that, in this example, six clamp ring elements 18, are equi-angularly distributed in a hexagonal arrangement around the circumference of the clamp ring 16 to surround the shaft 20.

The six clamp ring elements 18 are divided into two groups, each group being of three such elements 18. The members of those groups are designated 18A and 18B respectively where appropriate in the description that follows. Those groups are mutually opposed about the weld plane 14 and are angularly displaced or offset relative to each other about a central longitudinal axis to an extent necessary for their interdigitation. FIGS. 4 and 5 show that the clamp ring elements 18 of the two groups alternate around the circumference of the clamp ring 16 as 18A, 18B, 18A and so on.

Each clamp ring element 18 comprises a support 36 and a pad 38. An end of an actuator rod 32 is visible in the gap between the supports 36 and the shaft 20.

FIG. 4 shows the clamp ring 16 in a contracted state in which the pads 38 of the clamp ring elements 18 are held clear of the inner surface of the pipe length 12 for insertion before use, positioning for use and withdrawal after use of the ILUC 10. Conversely, FIG. 5 shows the clamp ring 16 in an expanded state in which the pads 38 of the clamp ring elements 18 are pressed against the inner surface of the pipe length 12 with clamping and aligning force.

FIG. 5 shows how the clamp ring 16 clamps the pipe lengths 12 and provides a backing ring for the weld. In this respect, it will be noted that the pads 38 together present a substantially continuous and unbroken circular backing surface to the inner surface of the pipe length 12.

In FIG. 5, the linkage rods 34 are visible only on the first group of three clamp ring elements 18 and hence only on alternating ones of the clamp ring elements 18A. Of course, corresponding linkage rods 34 would be visible on the second group of three clamp ring elements 18, and hence on the other three clamp ring elements 18B, if a cross-section on the weld plane 14 were viewed in the opposite direction.

As the supports 36 of the clamp ring elements 18 move radially outwardly away from the shaft 20 as the clamp ring 16 expands, the end of the actuator rod 32 is more fully revealed in FIG. 5 between the supports 36 and the shaft 20. Also visible now are the outer ends of the linkage rods 34 and their hinged connections to the actuator rod 32.

Each support 36 comprises a flat plate with parallel inner and outer faces, disposed at an internal angle of 120° with respect to its neighbours in cross-section. The supports 36 are all of equal length in this cross section taken on the weld plane 14 and so together form a regular hexagon.

The pad 38 surmounting each support 36 has a flat base at its interface with the support 36 and a curved outer side that is part-circular in cross-section. Longitudinal edges 46, 48 of the support 36 and the pad 38 respectively are chamfered such that the support 36 and the pad 38 taper radially inwardly in cross-section through the clamp ring 16.

Corresponding edges 46, 48 of each support 36 and the associated pad 38 adjoin and align to lie in the same plane. That plane lies at an internal angle of 120° with respect to an inner side of the clamp ring element 18 defined by the flat inner face of the support 36. Put another way, with respect to the plane of the interface between the support 36 and the pad 38, the chamfer of the edge 46 of the support 36 is at an internal angle of 60° and the chamfer of the edge 48 of the pad 38 is at an internal angle of 120°.

In the ILUC 10 of the invention, advancing the groups of wedge-shaped clamp ring elements 18 in opposition through the weld plane 14 increases the width of the clamp ring elements 18 on the weld plane 14 as shown in FIG. 5. The clamp ring elements 18 are driven for longitudinal movement relative to their counterparts in the opposite group by moving the actuator rods 32 and the associated linkage rods 34 in unison toward the weld plane 14. As a result, the length of the sides of the hexagon and the circumference of the clamp ring 16 increases while the hexagon remains regular on the weld plane 14.

Irrespective of the relative longitudinal positions of the groups of clamp ring elements 18, there will always be one cross-section at which those elements are of equal width so that the hexagon is regular and the ILUC 10 presents a circular cross section. This regular and circular cross-section is kept in alignment with the weld plane 14 by advancing the groups of clamp ring elements 18 longitudinally in angularly-offset mirror-image opposition about the weld plane.

As can be seen in FIG. 1, the linkage rods 34 swing outwardly to accommodate radially outward movement of the associated clamp ring elements 18 as the clamp ring 16 expands. Indeed, radial expansion or contraction of the clamp ring 16 is assisted by this pivoting or rotation of the linkage rods 34, which convert the longitudinal force applied by the actuator rods 32 into a combination of longitudinal and radial forces.

Figure 6:
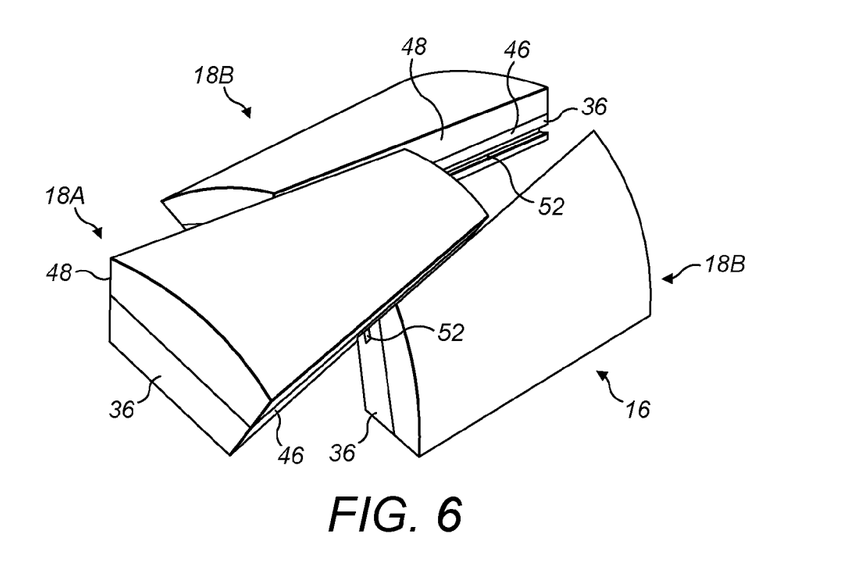
FIGS. 6 and 7 are schematic perspective views of three clamp ring elements shown respectively retracted longitudinally relative to their opposed counterparts to contract the clamp ring and advanced longitudinally relative to their opposed counterparts to expand the clamp ring.
Figure 7:
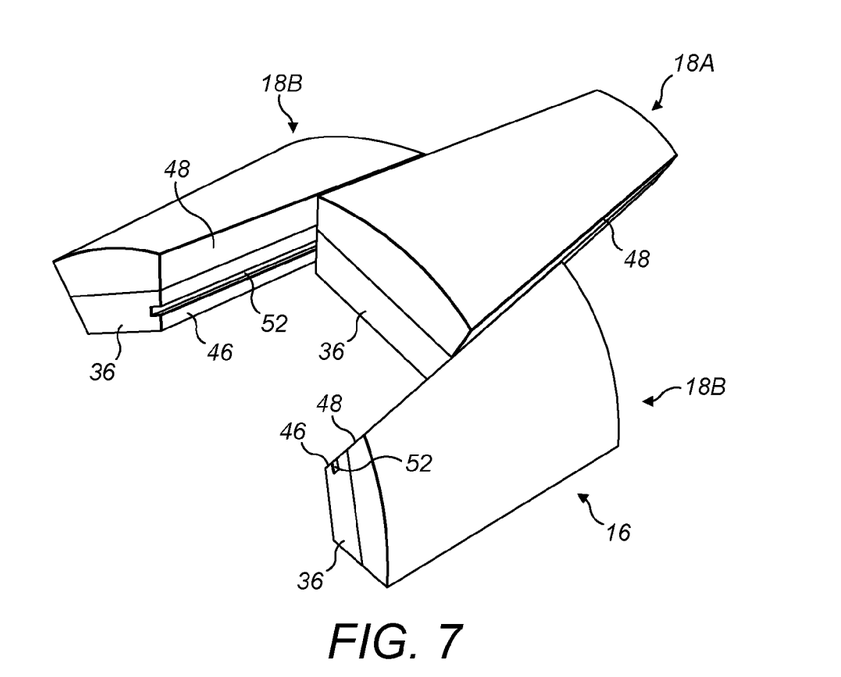
Figure 8:
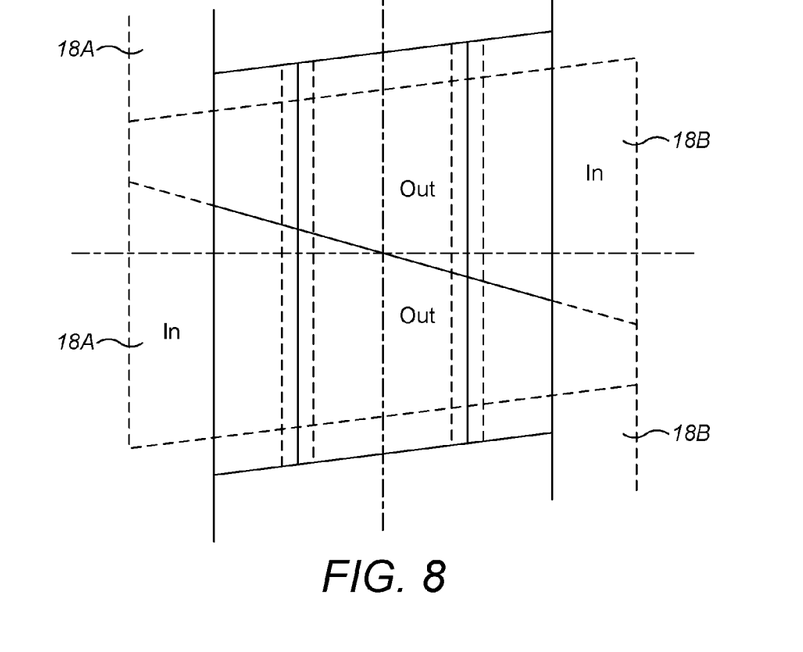
FIG. 8 is a detail side view of clamp ring elements of the ILUC shown in FIGS. 1 to 3, showing the extent of relative longitudinal movement of the elements and the resulting extent of expansion or contraction of the clamp ring.

The effect of expanding the clamp ring 16, by advancing together the groups of clamp ring elements 18 may be appreciated more fully with reference to FIGS. 6 to 8 of the drawings, to which reference is now made.

The cam-like interaction between circumferentially-alternating clamp ring elements 18A, 18B is best shown schematically in FIGS. 6 and 7. For clarity, these figures show only three clamp ring elements 18 and hence only half of the clamp ring 16, with one such element 18A from one group being disposed between two such elements 18B from the opposed group. Also for clarity, FIGS. 6 and 7 somewhat exaggerate the extent of relative longitudinal movement between the groups of clamp ring elements 18 and they omit the mechanisms that drive their longitudinal movement, which have already been explained and illustrated.

Viewed individually in plan view orthogonally to the plane of its support 36, each clamp ring element 18 is a trapezoid of isosceles trapezium outline. The clamp ring elements 18 are each elongate in a direction parallel to the central longitudinal axis of the ILUC 10, such that the inclined converging edges of the trapezoid are long edges spaced circumferentially around the clamp ring 16.

Considered longitudinally with respect to the related actuators 22, the trapezoid shape of each clamp ring element 18 is narrow at its forward or distal end and wide at its rearward or proximal end. Thus, each clamp ring element 18 has ramp edges that converge longitudinally toward and between the similar clamp ring elements 18 of the opposed group. By virtue of these opposed trapezoid shapes defining ramp edges, interaction between the circumferentially-alternating clamp ring elements 18A, 18B effects expansion and contraction of the clamp ring 16 as a result of relative longitudinal movement between the groups of clamp ring elements 18.

Advantageously, relative longitudinal movement between the groups of clamp ring elements 18 determines expansion and contraction of the clamp ring 16 by interaction between the circumferentially-alternating clamp ring elements 18A, 18B. This avoids the need for radially-acting actuators like those that add bulk and complexity in the prior art. In particular, it will be noted from FIGS. 1 to 5 that no drive mechanism or support mechanism is disposed between the clamp ring elements 18 and the shaft 20.

The interaction between the clamp ring elements 18A, 18B takes place along the abutting long edges of the clamp ring elements 18A, 18B, which are defined in this instance by the edges 46 of each support 36 and optionally also by the edges 48 of the associated pads 38. Specifically, it is along the edges 46, 48 that the clamp ring elements 18A, 18B are pressed together during expansion of the clamp ring 16. Also, it is along the edges 46 that the clamp ring elements 18A, 18B are held together during contraction of the clamp ring 16.

In this example, neighbouring clamp ring elements 18A, 18B are linked for relative movement along the abutting edges 46 of their supports 36 by complementary connector formations on those edges 46. An example of such a connector arrangement is shown in detail in FIG. 9 of the drawings. Here, opposed edges 46 of a clamp ring element 18B each have laterally-projecting male connector formations 50 such as pins or ridges. The male connector formations 50 are received in respective complementary female connector formations 52 of neighbouring clamp ring elements 18A, namely slots extending along their abutting edges 46. Slots serving as female connector formations 52 are also apparent in FIGS. 6 and 7.

Figure 9:
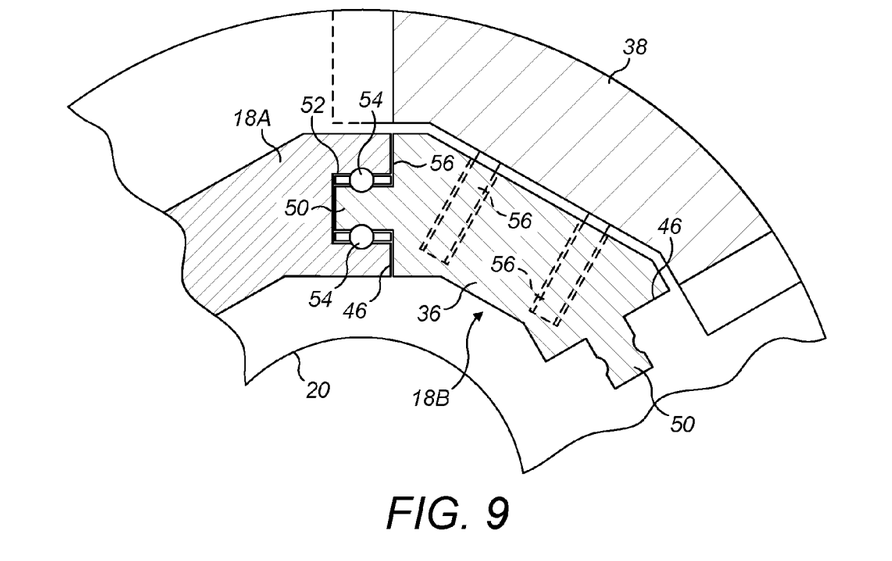
FIG. 9 is an enlarged partial cross-sectional view showing an interface between adjacent clamp ring elements of the ILUC shown in FIGS. 1 to 3.

It is preferred to support the connector formations 50, 52 with bearings to reduce friction. For example, FIG. 9 shows recesses in the male formations 50 and undercut grooves in the female formations 52 to accommodate ball bearings 54 between them. The ball bearings 54 also locate the male formations 50 in the female formations 52 and so hold the clamp ring elements 18A, 18B together during contraction of the clamp ring 16.

FIG. 9 also shows how a pad 38 may be coupled to a support 36 by springs 56 to cope with potential local out-of-roundness in the pipe lengths 12. It is also possible for a pad 38 to have built-in flexibility and resilience for this purpose.

Figure 10:
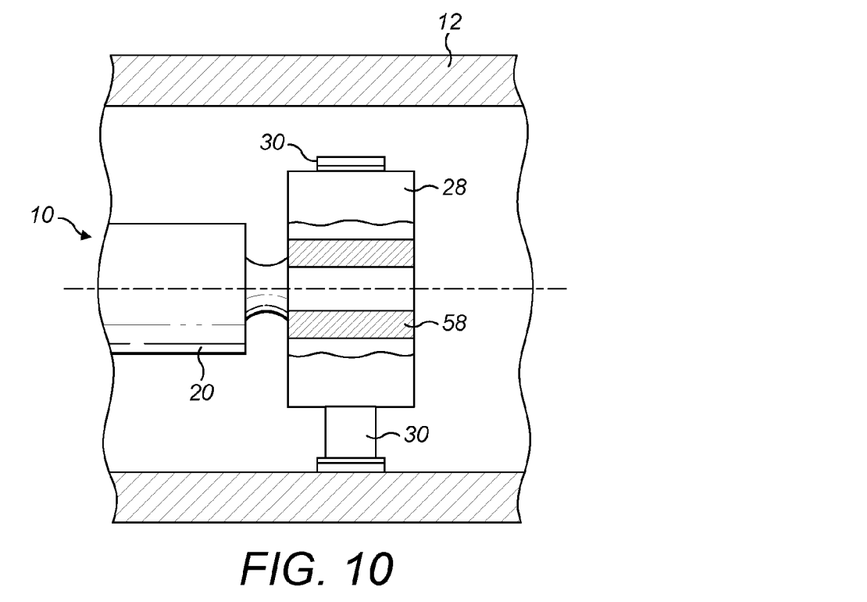
FIGS. 10 and 11 are enlarged detail views in partial longitudinal section showing optional mountings for the brake system shown in FIG. 3.
Figure 11:
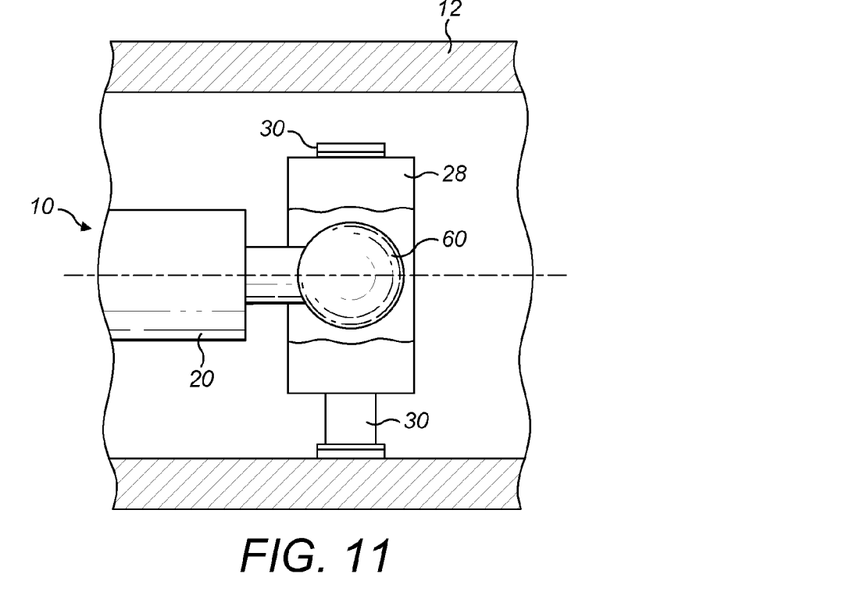

Turning finally to FIGS. 10 and 11 of the drawings, these drawings show mounting variants for a brake unit 28 that holds the ILUC 10 at a desired longitudinal position in the pipe before welding. As noted previously, the brake unit 28 has an arrangement of two or more opposed radially-acting jacks 30 that bear against the inner surface of a pipe length 12, as also shown in FIG. 3. Two such brake units 28 are suitably provided, one at each end of the shaft 20 of the ILUC 10. The use of two or more jacks 30 creates a problem of coping with angular deviations in the system.

To solve this problem, the brake units 28 may be mounted to the shaft 20 of the ILUC 10 by a flexible coupling such as the cylindrical bush 58 as shown in FIG. 10 or a hinged coupling such as the ball joint swivel 60 shown in FIG. 11. The bush 58 may comprise a polymer block or may be of the Silentbloc (trade mark) type.

Positioning the brake units 28 as far as possible from the clamp ring 16 and allowing them to swivel or deflect angularly relative to the shaft 20 of the ILUC 10 by up to 5° to 10° removes the need for preliminary fine alignment. Final angular alignment is fixed by the clamp ring. An easier and quicker alignment process saves time and money.

Many variations are possible without departing from the inventive concept. The actuators surrounding the shaft could be replaced by multiple synchronised actuators spaced angularly around the shaft to drive each respective clamp ring element via respective linkage arms.

The actuators need not be double-acting: springs acting longitudinally outwardly from the weld plane could drive the actuator rods away from the weld plane to contract the clamp ring when fluid pressure in the actuators is released.

There could be more or fewer clamp ring elements than the six shown in the above examples. There need not be an even number of clamp ring elements or, therefore, an equal number of clamp ring elements in the opposed groups.

In principle, there could be simple sliding contact between neighbouring clamp ring elements along their abutting edges or via their complementary or interlocking connector formations. However, if bearings are used between the clamp ring elements, other solutions such as roller bearings are possible.

Provision may be made for shielding using an inert gas, typically argon. Shielding is used to avoid contamination of the weld by atmospheric gas, which can generate brittle zones in the weld. So, the outer face of the clamp ring may have one or more openings such as grooves or holes positioned to lie under or adjacent the weld location, which openings are in communication with a system for injecting an inert gas.

The invention claimed is:

1. An internal line-up clamp for welding pipe lengths end-to-end, the clamp comprising:
 a clamp ring made up of a plurality of clamp ring elements that are angularly distributed around the circumference of the clamp ring and are divided into mutually interacting groups, which groups have wedging interaction and are interdigitated such that the clamp ring elements alternate from one group to the other around the circumference of the clamp ring, wherein neighbouring clamp ring elements in the clamp ring are linked by complementary connectors for relative movement along abutting edges of the clamp ring elements to hold the elements together during expansion and contraction of the clamp ring; and a longitudinally-acting actuator system arranged to drive longitudinal movement of the groups relative to each other, so that the relative longitudinal movement of the groups causes clamping expansion of the clamp ring by wedging interaction between the circumferentially-alternating clamp ring elements of the groups.

2. The clamp of claim 1, wherein both groups are movable longitudinally relative to a support structure of the clamp.

3. The clamp of claim 2, wherein the actuator system is arranged to synchronise longitudinal movement of the groups through a weld plane that is orthogonal to the direction of longitudinal movement.

4. The clamp of claim 1, wherein the actuator system comprises a pair of opposed actuators each acting on a respective one of the groups.

5. The clamp of claim 1, wherein at least one actuator of the actuator system is positioned longitudinally outboard of the clamp ring.

6. The clamp of claim 5, wherein the actuator is connected to a clamp ring element by a linkage that applies a radially outward force component to the clamp ring element when forced longitudinally by the actuator.

7. The clamp of claim 6 and comprising a guide on the actuator that is positioned to guide movement of the linkage.

8. The clamp of claim 1, wherein the actuator system extends around a central longitudinal axis of the clamp.

9. The clamp of claim 8, wherein an actuator of the actuator system is annular and surrounds a central shaft of the clamp.

10. The clamp of claim 1, wherein at least one actuator of the actuator system is double-acting to expand the clamp ring for clamping and to contract the clamp ring for insertion and removal.

11. The clamp of claim 1, wherein the complementary connectors comprise connector formations on the abutting edges on the clamp ring elements.

12. The clamp of claim 11, wherein a connector formation extends along an abutting edge of a clamp ring element.

13. The clamp of claim 11, wherein the clamp ring elements are held together against separation.

14. The clamp of claim 1, wherein abutting edges of the clamp ring elements are chamfered such that the clamp ring elements taper radially inwardly in cross-section through the clamp ring.

15. The clamp of claim 1, wherein each clamp ring element comprises a radially-inner support surmounted by a radially-outer pad, which pad is outwardly arcuate in cross-section.

16. The clamp of claim 1, wherein at least an outer face of each clamp ring element comprises a copper alloy, a ceramic or other weld-backing material.

17. The clamp of claim 1, wherein an outer face of at least one clamp ring element has at least one groove or other opening that is positioned to lie under or adjacent to a weld location during welding and that communicates with a system for injecting a shielding gas.

18. A method of aligning pipe lengths disposed end-to-end for welding, comprising:
 positioning an internal line-up clamp to bridge abutting ends of the pipe lengths; and
 expanding a clamp ring of the clamp to effect clamping of the pipe lengths;
 wherein the clamp ring is expanded to apply clamping force to the pipe lengths by driving relative longitudinal movement between interdigitated, mutually wedging interacting groups of clamp ring elements to cause wedging interaction by relative movement along abutting edges linked by complementary connectors of neighbouring clamp ring elements of the clamp ring, the complementary connectors between the abutting edges holding the clamp ring elements together during expansion and contraction of the clamp ring.

19. The method of claim 18, wherein the clamp ring is expanded in alignment with a weld plane between the abutting ends.

20. The method of claim 19, comprising aligning the pipe lengths and backing a weld between the pipe lengths with the same clamp ring.

21. The method of claim 18, comprising pressing together the clamp ring elements during expansion of the clamp ring.

22. The method of claim 18, comprising contracting the clamp ring for insertion or withdrawal of the clamp by effecting relative longitudinal retracting movement between the interdigitated groups of clamp ring elements.

23. The method of claim 22, wherein at least one of the groups is driven to effect the retracting movement.

24. The method of claim 22, wherein the clamp ring elements are held together during contraction of the clamp ring.

* * * * *